(12) United States Patent
Sasaki et al.

(10) Patent No.: US 9,397,347 B2
(45) Date of Patent: Jul. 19, 2016

(54) ELECTRODE FOR USE IN A FUEL CELL FUNCTIONING AS A GAS DIFFUSION LAYER AND AN ELECTROCATALYST LAYER

(75) Inventors: Naokazu Sasaki, Chiba (JP); Katsuyuki Matsubayashi, Chiba (JP); Kyosuke Iida, Chiba (JP); Yasuo Imashiro, Chiba (JP); Jun-ichi Ozaki, Kiryu (JP)

(73) Assignees: NISSHINBO HOLDINGS INC., Tokyo (JP); NATIONAL UNIVERSITY CORPORATION GUNMA UNIVERSITY, Maebashi-shi (JP)

( * ) Notice: Subject to any disclaimer, the term of this patent is extended or adjusted under 35 U.S.C. 154(b) by 410 days.

(21) Appl. No.: 13/811,866

(22) PCT Filed: Jul. 21, 2011

(86) PCT No.: PCT/JP2011/066535
§ 371 (c)(1),
(2), (4) Date: Jan. 23, 2013

(87) PCT Pub. No.: WO2012/014768
PCT Pub. Date: Feb. 2, 2012

(65) Prior Publication Data
US 2013/0122391 A1  May 16, 2013

(30) Foreign Application Priority Data
Jul. 29, 2010  (JP) ................................ 2010-170291

(51) Int. Cl.
*H01M 4/36* (2006.01)
*H01M 4/90* (2006.01)
*H01M 4/86* (2006.01)
*H01M 8/10* (2016.01)

(52) U.S. Cl.
CPC .......... *H01M 4/9083* (2013.01); *H01M 4/8605* (2013.01); *H01M 4/8652* (2013.01); *H01M 8/1004* (2013.01); *H01M 2008/1095* (2013.01); *Y02E 60/521* (2013.01)

(58) Field of Classification Search
CPC ............ H01M 4/9083; H01M 4/8605; H01M 4/8652; H01M 8/1004; H01M 2008/1095; Y02E 60/521
See application file for complete search history.

(56) References Cited

U.S. PATENT DOCUMENTS 3,671,323 A * 6/1972 Sandler ......................... 429/524
2009/0068461 A1   3/2009 Reneker et al.
(Continued)

FOREIGN PATENT DOCUMENTS

EP   2298442 A1   3/2011
JP   2003-112914   * 4/2003   ................ B82B 1/00
(Continued)

OTHER PUBLICATIONS

International Search Report of PCT/JP2011/066535, mailing date of Nov. 1, 2011.

*Primary Examiner* — Raymond Alejandro
(74) *Attorney, Agent, or Firm* — Westerman, Hattori, Daniels & Adrian, LLP

(57) ABSTRACT

An electrode for use in a fuel cell comprises a flexible carbon-fiber nonwoven fabric and a fuel cell catalyst, such as a metal catalyst or a carbon alloy catalyst, supported on the surfaces of the carbon fibers constituting the flexible carbon-fiber nonwoven fabric. The flexible carbon-fiber nonwoven fabric is formed by carbonizing a nonwoven fabric obtained by electrospinning a composition containing: an electrospinnable macromolecular substance; an organic compound that is different from the macromolecular substance; and a transition metal. This structure allows the provision of an electrode, for use in a fuel cell, which uses a flexible carbon-fiber nonwoven fabric as a substrate and combines the functions of a gas-diffusion layer and an electrocatalyst layer.

10 Claims, 7 Drawing Sheets

(56) References Cited

U.S. PATENT DOCUMENTS

| | | |
|---|---|---|
| 2010/0323272 A1 | 12/2010 | Ozaki et al. |
| 2011/0012296 A1 | 1/2011 | Nakanichi et al. |
| 2011/0143253 A1 | 6/2011 | Miyata et al. |

FOREIGN PATENT DOCUMENTS

| | | |
|---|---|---|
| JP | 2003-112914 A | 4/2003 |
| JP | 2005-036333 A | 2/2005 |
| JP | 2007-515364 A | 6/2007 |
| JP | 2009-133037 A | 6/2009 |
| JP | 2009-181783 A | 8/2009 |
| JP | 2009-291714 A | 12/2009 |
| JP | 2010-118269 A | 5/2010 |
| WO | 2009/098812 A1 | 8/2009 |
| WO | 2009/148111 A1 | 12/2009 |
| WO | 2011/070893 A1 | 6/2011 |

\* cited by examiner 200 mA/cm²

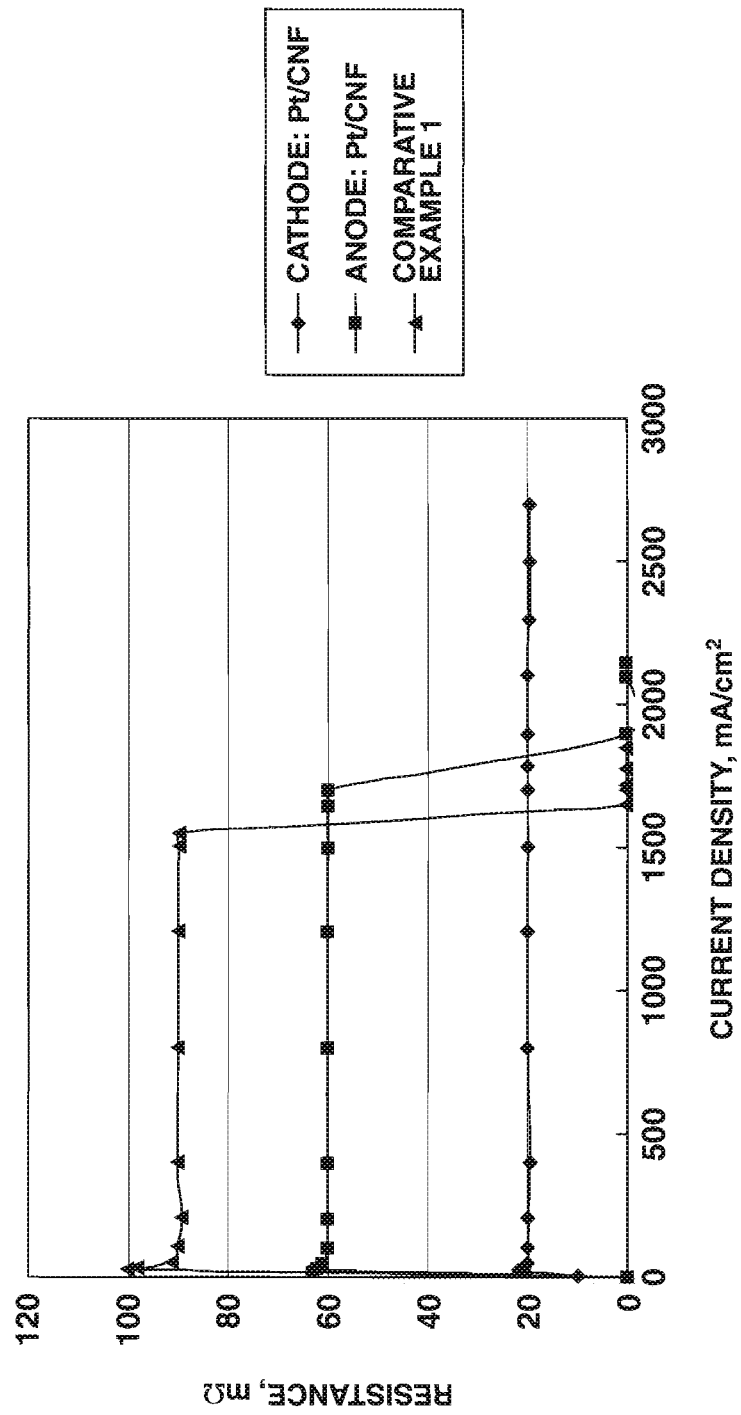

ELECTRODE FOR USE IN A FUEL CELL FUNCTIONING AS A GAS DIFFUSION LAYER AND AN ELECTROCATALYST LAYER

TECHNICAL FIELD

The present invention relates to a fuel cell electrode, and more particularly to a fuel cell electrode which functions as both a gas diffusion layer and an electrocatalyst layer.

BACKGROUND ART

A fuel cell is a device which, when supplied with a fuel such as hydrogen and with atmospheric oxygen, causes the fuel and oxygen to react electrochemically, producing water and directly generating electricity. Because fuel cells are capable of achieving a high energy conversion efficiency and have an excellent environmental adaptability, they are being developed for a variety of applications, including small-scale local power generation, household power generation, simple power sources for campgrounds and the like, mobile power sources such as for automobiles and small boats, and power sources for satellites and space development.

Such fuel cells, particularly polymer electrolyte fuel cells, are built in the form of modules composed of many unit cells stacked in series. Each unit cell has a membrane electrode assembly which is composed of a solid polymer electrolyte membrane and, disposed on either side thereof, an anode and a cathode. The membrane electrode assembly is in turn sandwiched between a pair of separators.

The anode and cathode are generally each composed of two layers: an electrocatalyst layer positioned on the electrolyte membrane side, and a gas diffusion layer positioned on the separator side. Therefore, the membrane electrode assembly overall is generally composed of five layers.

In recent years, the structure which consists of carbon fiber has started to be used as the substrate for such electrocatalyst layers and gas diffusion layers.

For example, Patent Document 1 discloses a catalyst-loaded carbon nanofiber (sometimes abbreviated below as "CNF") electrocatalyst layer for fuel cells which is in the form of a nonwoven fabric composed of nitrogen-containing carbon nanofibers and catalyst particles bonded to the nitrogen atoms.

Patent Document 2 discloses a fuel cell catalyst electrode composed of a catalyst supported on an electrically conductive continuous fiber sheet.

Patent Document 3 discloses a gas diffusion layer composed of a woven fabric of carbon fiber filaments having a fiber size of from 0.3 to 1.5 decitex.

Patent Document 4 discloses a carbon alloy catalyst composed of nanofibers having a nanoshell structure. In this carbon alloy catalyst, the carbon structure itself which makes up the nanofibers has a catalytic activity.

The electrocatalyst layer of Patent Document 1 is characterized by including nitrogen atoms in the carbon nanofibers in order to prevent sintering of the supported catalyst particles. Fabricating such nitrogen-containing carbon nanofibers requires low-temperature heat-treating at not above 900° C. At such temperatures, the carbonization that takes place is insufficient, resulting in a poor electrical conductivity. Therefore, when this electrocatalyst layer is to be used as a membrane electrode assembly, it is necessary either to add an electrically conductive material or to apply treatment so as to impart conductivity to the fibers themselves.

Moreover, Patent Document 1 does not mention the use of the electrocatalyst layer as a gas diffusion layer.

In the electrocatalyst layer of Patent Document 2, the catalyst loading in the working examples is high at 1 mg/cm². Moreover, even compared with a catalyst on a particulate carbon layer, the difference in maximum electromotive force is only on the order of 1.3-fold or more. This is attributable to the fact that, owing to the insufficient flexibility of the conductive fiber nonwoven fabric, adhesion at the membrane-bonding interfaces is poor, thus making it impossible to lower the resistances at the membrane-bonding interfaces of the catalyst-loaded conductive fiber nonwoven fabric surface with the electrolyte membrane and the gas diffusion layer by merely lowering the sheet resistance at the surface of the conductive fiber nonwoven fabric.

Moreover, in Patent Document 2, carbon paper is used in fuel cell fabrication as a support having gas diffusivity. The use of the electrocatalyst layer also as a gas diffusion layer is not mentioned.

The woven fabric composed of carbon fiber filament bundles which makes up the gas diffusion layer in Patent Document 3 is, on a macroscopic level, relatively supple and thus can be subjected to rolling treatment. However, when the woven fabric is examined on a microscopic level, the fiber diameter, at about 6 μm, is large and so the individual fibers are rigid. In addition, because the fibers are in the form of filament bundles, fuzz generation readily occurs, as a result of which the fibers may pierce the electrolyte, which may lead to shorting between the anode and cathode and fuel gas leakage. Hence, it is necessary to carry out surface treatment on the gas diffusion layer.

Moreover, Patent Document 3 does not mention the use of the gas diffusion layer as an electrocatalyst layer.

In the art of Patent Document 4, carbon alloy catalyst (nanoshell structure) particles are formed within nanofibers, thereby preventing coarsening of the particles and enabling fine catalyst particles to be obtained. In this carbon alloy catalyst, much catalyst is present at the interior of the fibers, but this catalyst does not contribute to the redox reactions. Carbon catalyst particles, in and of themselves, have a poor electrical conductivity, and fibers which are formed substantially of catalyst particles alone also have a poor conductivity.

Hence, it is substantially impossible with such nanofibers alone to impart the functions of both a gas diffusion layer and an electrocatalyst.

As noted above, both a gas diffusion layer and an electrocatalyst layer are fundamentally required in the art of Patent Documents 1 to 4.

On the other hand, Patent Document 5 discloses a membrane electrode assembly obtained by depositing a catalyst precursor on a carbon nanofiber nonwoven fabric, then heat-treating the catalyst precursor, which membrane electrode assembly has both a gas diffusing ability and an electrode performance.

However, in the art of Patent Document 5, the catalyst is limited to a carbon catalyst. Hence, as will be described in detail subsequently in the comparative examples, because the carbon nanofibers used are brittle structures lacking in flexibility, the nonwoven fabric structure breaks down under the forces incurred during molding of the membrane electrode assembly, causing gas diffusivity and water drainage by the resulting membrane electrode assembly to decline. These declines are in turn accompanied by a large drop in the power-generating performance when the membrane electrode assembly is used in a fuel cell.

CITATION LIST

Patent Document

Patent Document 1: JP-A 2010-118269
Patent Document 2: JP-A 2009-181783

Patent Document 3: JP-A 2005-36333
Patent Document 4: WO 2009/098812
Patent Document 5: WO 2009/148111

SUMMARY OF INVENTION

Technical Problem

It is therefore an object of the present invention to provide a fuel cell electrode in which a flexible carbon fiber nonwoven fabric serves as the substrate, and which combines the functions of both a gas diffusion layer and an electrocatalyst layer.

Solution to Problem

The inventor earlier reported that when a nonwoven fabric electrospun from a composition prepared by mixing at least two organic components, one of which is an electrospinnable polymeric substance and another of which is a different organic compound, with a transition metal is then carbonized, there can be obtained a flexible carbon fiber nonwoven fabric having such a good resistance to folding that it does not break even when folded in two (Japanese Patent Application No. 2009-279112).

Based on this knowledge, the inventor has conducted further investigations, discovering as a result that a nonwoven fabric structure which is obtained by supporting a fuel cell catalyst on the surfaces of carbon fibers in such a flexible carbon fiber nonwoven fabric can exhibit the functions of both the gas diffusion layer and the electrocatalyst layer in a fuel cell and thus is capable of generating electricity even when a separate gas diffusion layer is not provided, and moreover has a better power generating performance than the above-described conventional membrane electrode assemblies with a five-layer structure.

Accordingly, the invention provides:
1. A fuel cell electrode having both a gas diffusion function and an electrocatalyst function, including: a flexible carbon fiber nonwoven fabric obtained by carbonizing a nonwoven fabric electrospun from a composition containing an electrospinnable polymeric substance, an organic compound differing from the polymeric substance, and a transition metal; and a fuel cell catalyst supported on surfaces of the carbon fibers making up the carbon fiber nonwoven fabric.
2. The fuel cell electrode of 1, wherein the fuel cell catalyst is a metal catalyst or a carbon alloy catalyst.
3. A membrane electrode assembly having an electrolyte layer and, disposed on either side thereof, an anode and a cathode,
wherein at least one of the anode and the cathode is made up of the fuel cell electrode of 1 or 2.
4. The membrane electrode assembly of 3, wherein the cathode is made up of the fuel cell electrode of 1 or 2.
5. The membrane electrode assembly of 3, wherein the anode and the cathode are each made up of the fuel cell electrode of 1 or 2.
6. A fuel cell having a plurality of unit cells stacked in series, each of which includes: a membrane electrode assembly having an electrolyte layer and, disposed on either side thereof, an anode and a cathode; and a pair of separators disposed on either side of the membrane electrode assembly,
wherein at least one of the anode and the cathode is made up of the fuel cell electrode of 1 or 2.
7. The fuel cell of 6, wherein the cathode is made up of the fuel cell electrode of 1 or 2.
8. The fuel cell of 6, wherein the anode and the cathode are each made up of the fuel cell electrode of 1 or 2.
9. A membrane electrode assembly made up of the fuel cell electrode of 1 or 2.
10. A fuel cell which includes the fuel cell electrode of 1 or 2.

Advantageous Effects of Invention

Because the fuel cell electrode of the invention has both a gas diffusion function and a catalyst function, it eliminates the need for gas diffusion layers during fabrication of the membrane electrode assembly. The membrane electrode assembly can thus be made thinner, as a result of which the fuel cell stack can be made thinner and smaller.

Also, in the electrode of the invention, because a catalyst is supported on the surfaces of the conductive carbon nanofibers making up the nonwoven fabric, the electricity generated at the catalyst is conducted without loss to the CNF fibers. In addition, by using long fibers as the conductive path, loss to the system exterior (resistance) is reduced.

Moreover, because the inventive electrode is in a fibrous form (i.e., of definite shape), an electrolyte polymer film of Nafion™ or the like, which serves as the proton path, is easily formed, the efficiency with which a three-phase interface forms between the fuel (gas), the catalyst (solid) and the protons (liquid) is good, making it possible to reduce the catalyst loading.

Furthermore, because the electrode of the invention is a nonwoven fabric, it has numerous communicating pores which are not easily obstructed by water that forms during power generation. As a result, when this electrode is used as the cathode, flooding diminishes, enabling stable power generation to be carried out even during high-output power generation in which a large amount of water is produced.

Therefore, fuel cells which include a membrane electrode assembly composed of an electrolyte layer sandwiched between the electrodes of the invention have power generation characteristics superior to those of membrane electrode assemblies with a conventional five-layer structure (gas diffusion layer/catalyst layer/electrolyte membrane/catalyst layer/gas diffusion layer).

Also, because a catalyst-loaded CNF nonwoven fabric can be supplied as a roll of continuous nonwoven fabric sheet, it is possible to simplify the process of fabricating membrane assemblies for fuel cells by carrying it out as a "roll-to-roll" operation.

BRIEF DESCRIPTION OF DIAGRAMS

Figure 5:
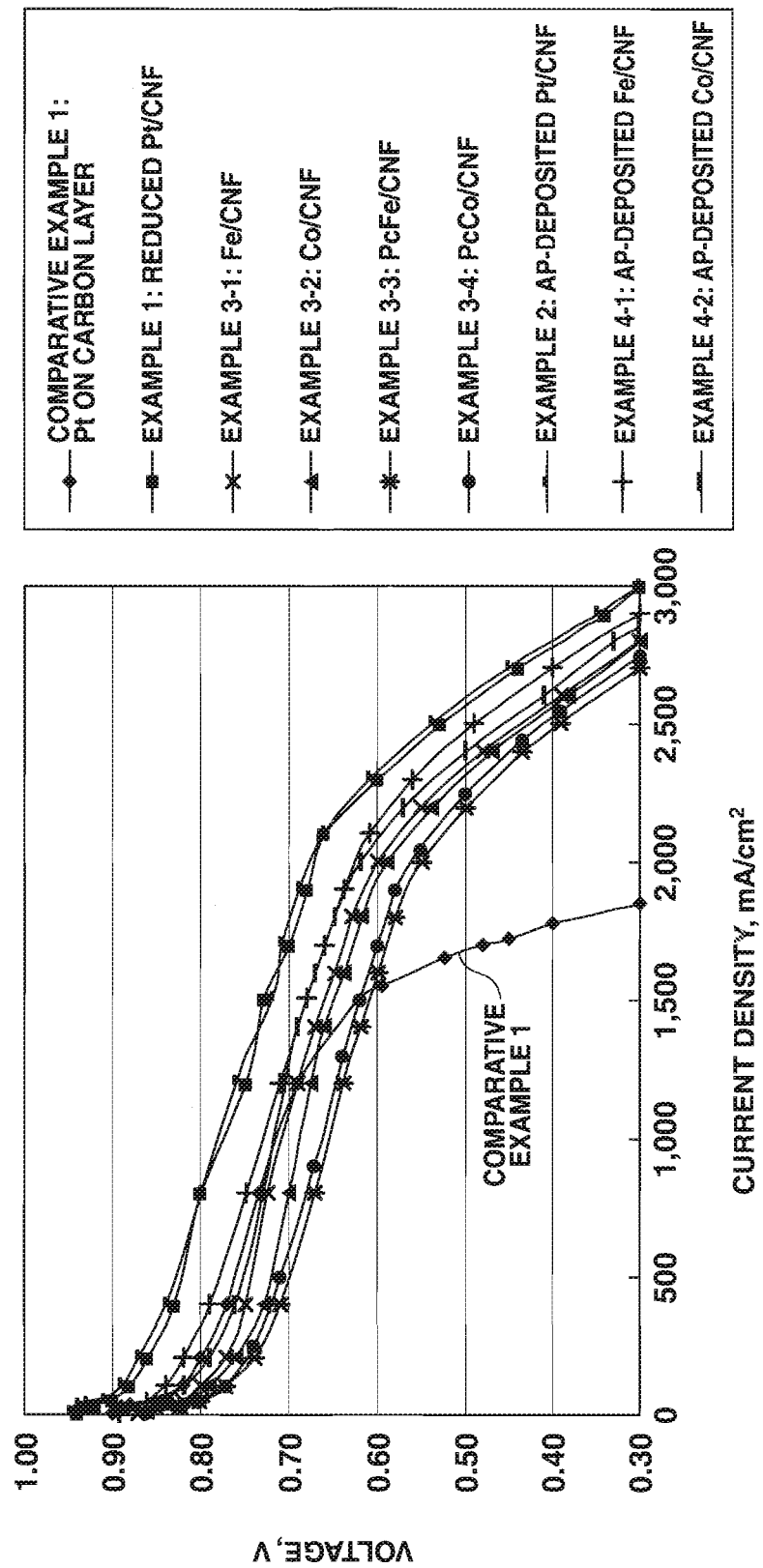

FIG. 5 is a graph showing the relationship between the current densities and the voltages of the membrane electrode assemblies obtained in Examples 1 to 4-2 and Comparative Example 1. "Reduced Pt/CNF" represents Example 1, "AP-deposited Pt/CNF" represents Example 2, "Fe/CNF" represents Example 3-1, "Co/CNF" represents Example 3-2, "PcFe/CNF" represents Example 3-3, "PcCo/CNF" represents Example 3-4, "AP-deposited Fe/CNF" represents Example 4-1, and "AP-deposited Co/CNF" represents Example 4-2.

Figure 6:
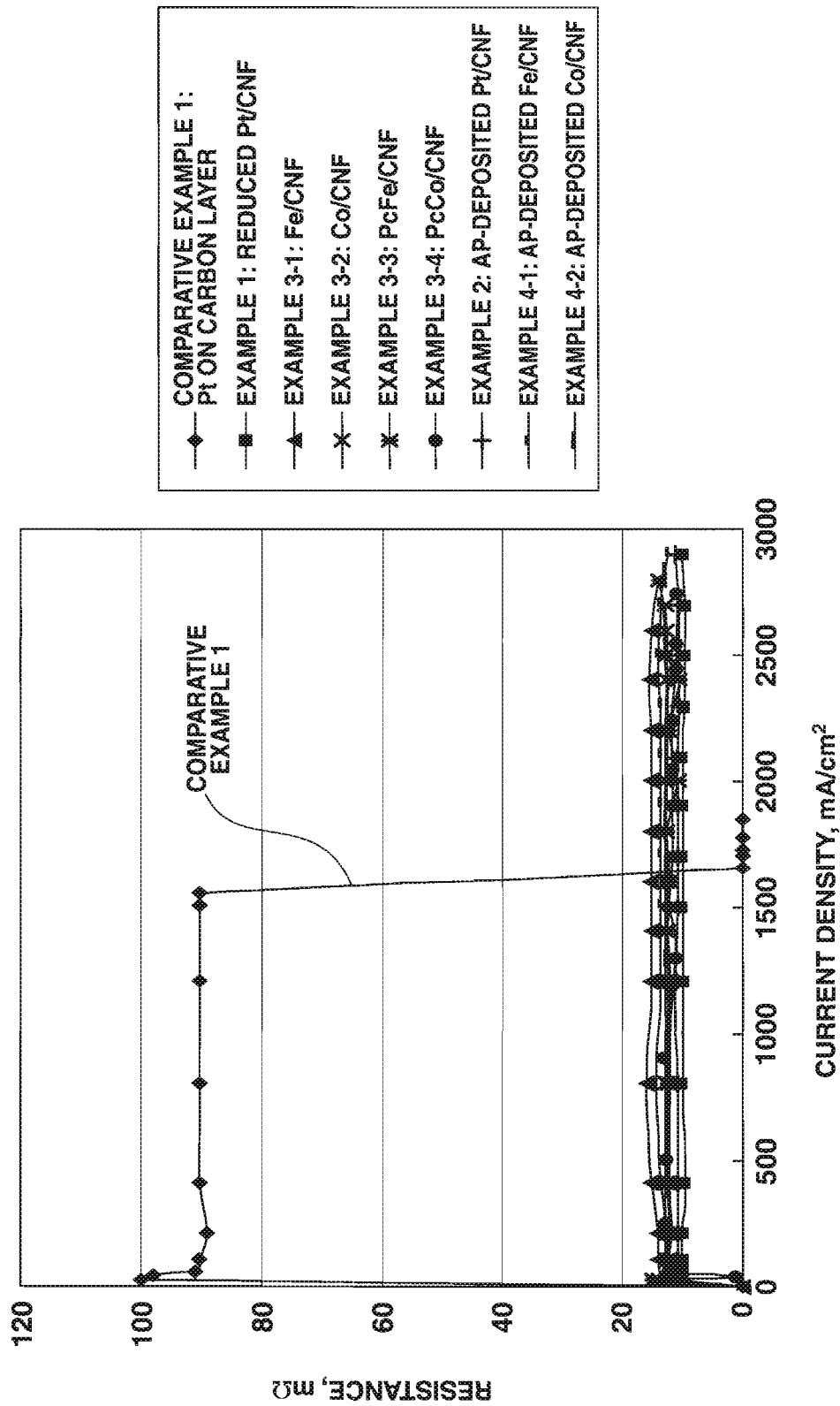

FIG. 6 is a graph showing the relationship between the current densities and resistances of the membrane electrode assemblies obtained in Examples 1 to 4-2 and Comparative Example 1. "Reduced Pt/CNF" represents Example 1, "AP-deposited Pt/CNF" represents Example 2, "Fe/CNF" represents Example 3-1, "Co/CNF" represents Example 3-2, "PcFe/CNF" represents Example 3-3, "PcCo/CNF" represents Example 3-4, "AP-deposited Fe/CNF" represents Example 4-1, and "AP-deposited Co/CNF" represents Example 4-2.

Figure 7:
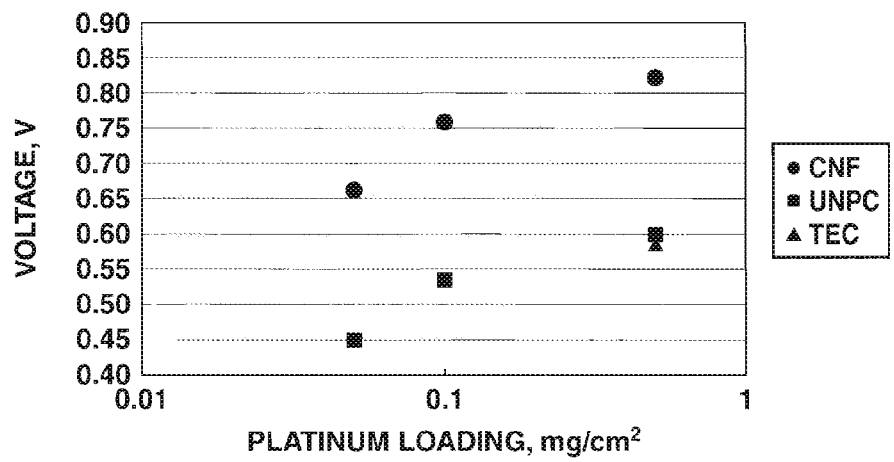

FIG. 7 is a graph showing the relationship between the platinum loadings and the cell voltages at a current density of 200 mA/cm$^2$ for the membrane electrode assemblies obtained in Example 5 and Comparative Examples 2 and 3. "CNF" represents Example 5, "UNPC" represents Comparative Example 2, and "TEC" represents Comparative Example 3.

Figure 8:
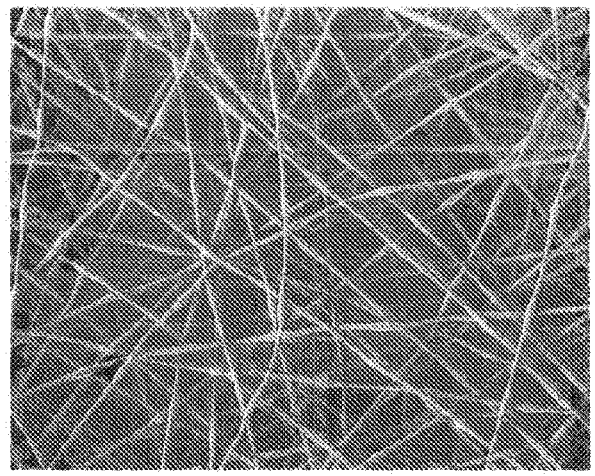

FIG. 8 is a scanning electron micrograph of the cathode surfaces in the membrane electrode assembly obtained in Example 3-2.

Figure 9:
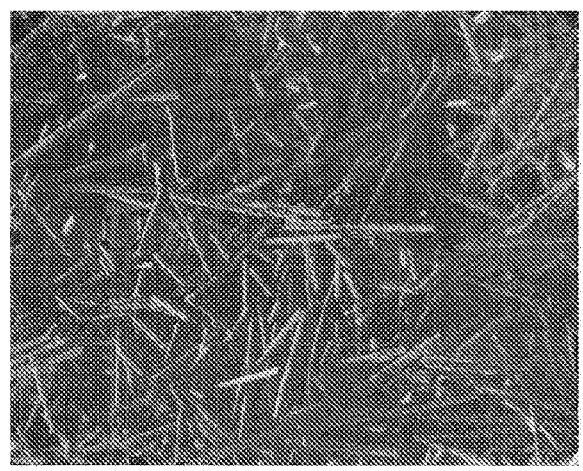

FIG. 9 is a scanning electron micrograph of the cathode surfaces in the membrane electrode assembly obtained in Comparative Example 4.

Figure 10:
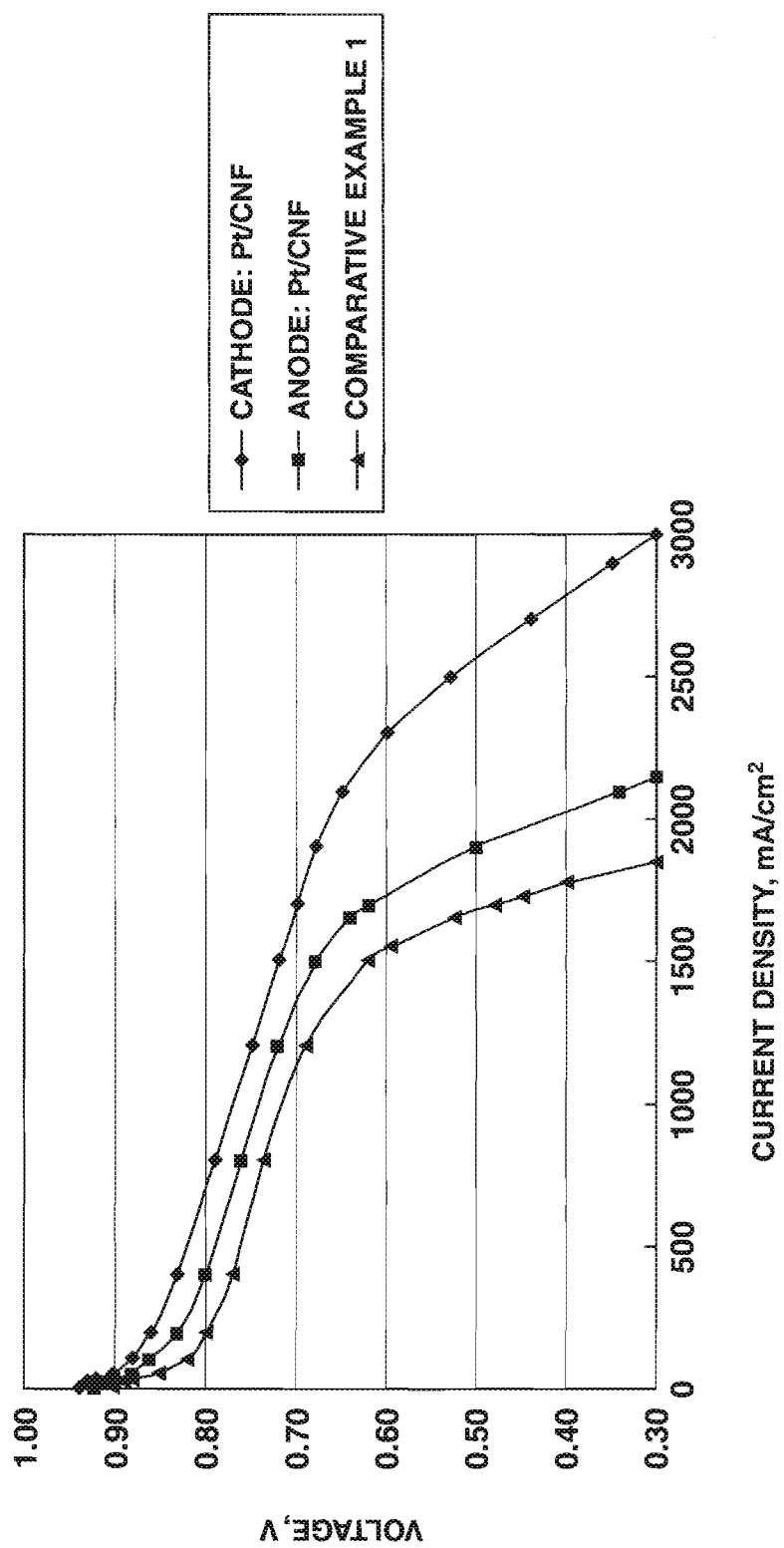

FIG. 10 is a graph showing the relationship between the current density and the voltage for the membrane electrode assembly obtained in Example 6. "Cathode: Pt/CNF" indicates the results for Example 6-1, and "Anode: Pt/CNF" indicates the results for Example 6-2.

FIG. 11 is a graph showing the relationship between the current density and the resistance of the membrane electrode assembly obtained I Example 6. "Cathode: Pt/CNF" indicates the results for Example 6-1, and "Anode: Pt/CNF" indicates the results for Example 6-2.

DESCRIPTION OF EMBODIMENTS

The invention is described more fully below.

The inventive fuel cell electrode having both a gas diffusion function and an electrocatalytic function includes a flexible carbon fiber nonwoven fabric obtained by carbonizing a nonwoven fabric electrospun from a composition containing an electrospinnable polymeric substance, an organic compound differing from the polymeric substance, and a transition metal; and a fuel cell catalyst supported on surfaces of the carbon fibers making up the carbon fiber nonwoven fabric.

In the invention, the electrospinnable polymer substance is not subject to any particular limitation and may be suitably selected from among hitherto known electrospinnable polymeric substances.

Illustrative examples include polyacrylonitrile resins, polyester resins, polyurethane resins, polyethylene resins, polypropylene resins, polyacrylic resins, polyether resins, polyvinylidene chloride resins, polyvinyl resins, polyamide resins, polyimide resins and polyamide-imide resins. These may be used singly, or two or more may be used in combination.

Of these, to further increase the folding strength of the resulting carbon fiber nonwoven fabric, a polymeric substance containing a nitrogen atom on the molecule is preferred, and a polyacrylonitrile resin is especially preferred.

In this invention, to have the resulting carbon fiber nonwoven fabric manifest a flexibility and toughness that keeps it from failing even when folded, it is critical for the above-described electrospinnable polymeric substance and an organic compound commonly used as a carbon precursor to be used together. By using these two ingredients together, even in cases where a carbon fiber precursor organic compound that is difficult to electrospin by itself is employed, the electrospinnable polymer plays the role of a "connector," allowing the overall composition to be electrospun and also preventing the development of graphene sheets in the carbon fibers making up the resulting ultrafine carbon fiber nonwoven fabric. Hence, carbon fibers having a good resistance to folding can be obtained.

The organic compound is a substance which differs from the above-described polymeric substance. Any of the various compounds which have hitherto been employed as carbon precursor materials may be used.

Illustrative examples include phenolic resins, epoxy resins, melamine resins, urea resins, polycarbodiimide, pitch, cellulose, cellulose derivatives and lignin. These may be used singly or two or more may be used in combination.

In cases where the polymeric substance used is one which does not contain a nitrogen atom, for the same reasons as indicated above, it is preferable for the organic compound to be one which contains a nitrogen atom.

A transition metal is essential for achieving the desired flexibility and toughness in the carbon fiber nonwoven fabric used in the present invention.

That is, by making use of a transition metal-containing composition, when heat is applied to the nonwoven fabric electrospun from this composition, fusion can be prevented from occurring up until the heat-treating temperature is reached, and the carbon fiber nonwoven fabric following carbonization can be conferred with a flexibility and toughness that keep the fabric from failing even when folded.

Such transition metals are not subject to any particular limitation, and are exemplified by titanium, cobalt, iron, nickel, copper, zirconium and platinum. Of these, titanium, iron and cobalt are preferred. These may be used singly, or two or more may be used in combination.

These transition metals are preferably used in the form of a complex, salt, hydroxide, sulfide or organic acid salt. For example, preferred use may be made of tetraalkoxytitaniums such as tetra-n-butoxytitanium; titanium halides such as titanium(III) chloride and titanium(IV) chloride; organic acid salts such as the ammonium salt of titanium lactate; cobalt halides such as cobalt(II) chloride, cobalt(III) chloride, cobalt (II) bromide, cobalt(II) fluoride, cobalt(III) fluoride and cobalt(II) iodide; organic acid salts of cobalt such as cobalt (II) acetate and cobalt(II) octanoate; cobalt(II) iodate, cobalt (II) hydroxide, cobalt(II) nitrate and cobalt(III) nitrate; iron halides such as iron(II) chloride, iron(III) chloride, iron bromide and iron(II) iodide; organic acid salts of iron such as iron(II) acetate, iron(III) acetate and iron(II) octanoate; iron (II) iodate, iron(II) hydroxide, iron(III) hydroxide, iron(II) nitrate, iron(III) nitrate, iron(II) sulfate and iron(III) sulfate; nickel(II) chloride, nickel(II) hydroxide, nickel(II) sulfate, nickel carbonyl, nickel sulfamate and lithium nickel oxide; copper chloride, copper acetate, copper nitrate, copper hydroxide, copper carbonate, copper fluoride, copper iodate and copper sulfate; zirconium oxychloride, zirconium sulfate, zirconium nitrate, zirconium acetate, ammonium zirconium carbonate, zirconium octanoate, zirconium tetra-n-propoxide, zirconium tetraacetylacetonate; and platinum(II) chloride, platinum(IV) chloride, platinum(IV) bromide and hexachloroplatinic acid salts.

The contents of the above polymeric substance, organic compound and transition metal in the composition used to produce the carbon fiber nonwoven fabric of the invention are not subject to any particular limitations, provided the composition is capable of being electrospun, although it is preferable for the polymeric substance to be included in an amount of from 1.0 to 15 parts by weight, and especially from 1.5 to 15 parts by weight; for the organic compound to be included in an amount of from 1.0 to 15 parts by weight, and especially from 1.5 to 15 parts by weight; and for the transition metal to be included in an amount (metal basis) of from 0.1 to 2 parts by weight, and especially from 0.1 to 1.5 parts by weight.

Any suitable method may be used to prepare the composition, so long as each of the above ingredients is mixed in accordance with common practice. The ingredients may be mixed in any suitable order.

In the practice of the invention, because electrospinning is used to obtain the ultrafine fiber nonwoven fabric, it is essential to employ a solvent for preparing an electrospinning dope.

A solvent which is capable of dissolving the resin to be used may be suitably selected and employed as this solvent. Illustrative examples of solvents which may be used include water, acetone, methanol, ethanol, propanol, isopropanol, toluene, benzene, cyclohexane, cyclohexanone, tetrahydrofuran, dimethylsulfoxide, 1,4-dioxane, carbon tetrachloride, methylene chloride, chloroform, pyridine, trichloroethane, N,N-dimethylformamide, N,N-dimethylacetamide, N-methyl-2-pyrrolidone, ethylene carbonate, diethyl carbonate, propylene carbonate and acetonitrile, as well as organic acids such as formic acid, lactic acid and acetic acid. These solvents may be used singly, or two or more may be mixed and used together.

The solvent may be included in any order. That is, it may be mixed together with the various above ingredients or it may be added after the above composition has been prepared.

Electrospinning is a process in which, as an electrically charged electrospinning dope (electrospinning solution) is spun within an electrical field, the dope is broken up by forces of repulsion between the electrical charges, resulting in the formation of a very fine fibrous material composed of the resin.

Specifically, with a nozzle for ejecting the dope serving as a first electrode and a collector serving as a second electrode, a high voltage of from several thousands to several tens of thousands of volts is applied to the dope, causing the dope to be discharged as a jet from the nozzle. Due to the high-speed jet and subsequent folding and expansion of the jet within the electrical field, the discharged dope forms into ultrafine fibers which collect on the collector surface as an ultrafine fiber nonwoven fabric.

The resulting ultrafine fiber nonwoven fabric is then heat-treated, giving an ultrafine carbon fiber nonwoven fabric.

At this time, if the ultrafine fiber nonwoven fabric has been obtained using a polymer that is conducive to stabilization treatment, the fiber surface may be oxidized and subjected to curing and stabilization treatment as in the prior art.

In such a case, the heating temperature is not subject to any particular limitation, so long as stabilization is possible. Generally, the method used may be one in which the temperature is raised from room temperature to about 300° C. over a period of about 2 to about 10 hours, after which the same temperature is maintained for a period of from about 30 minutes to about 3 hours.

However, even without carrying out conventional stabilization treatment, the ultrafine fiber nonwoven fabric obtained as described above may be rendered into an ultrafine carbon fiber nonwoven fabric without fusion and uniting of the fibers by gradual heating in an inert gas atmosphere to the heat-treating temperature of from about 800 to about 1,500° C.

The heating rate may be set as suitable, such as from about 1° C./min to about 10° C./min. Temperature control need not be very strict.

The resulting ultrafine carbon fiber nonwoven fabric of the invention is a flexible carbon fiber nonwoven fabric which has sufficient resistance to folding to avoid breaking even when folded in two.

Moreover, this flexibility is retained even after the metal atoms have been removed from the resulting carbon fiber nonwoven fabric. It appears from this that the transition metal has the function of building, in the course of carbonization, a structure having a good resistance to folding. Removal of the metal atoms may be carried out by, for example, acid treatment. Such acid treatment may be carried out by exposing the carbon fiber nonwoven fabric to an inorganic acid such as hydrochloric acid, nitric acid or sulfuric acid, either alone or as a mixed acid obtained by mixture thereof.

The carbon fibers making up the ultrafine carbon fiber nonwoven fabric of the invention have a fiber diameter of preferably from 0.1 to 15 more preferably from 0.1 to 10 and even more preferably from 0.1 to 1 The carbon fibers have a pore size, as measured by the bubble point method, of preferably 5 μm or less, and a pore size at the surface of preferably from 0.4 to 50 nm. The fibers have at the surface a micropore (2 nm and smaller) surface area of preferably from 27 to 2,700 $m^2/g$, and have a BET specific surface area of preferably from 30 to 3,000 $m^2/g$.

The carbon fiber nonwoven fabric has a basis weight of preferably from 0.3 to 100 $g/m^2$, a thickness of preferably from 5 to 500 μm, and a bulk density of preferably from 0.06 to 0.3 $g/cm^3$.

The bending stiffness of the nonwoven fabric, as measured by Method B (slide method) described in JIS L 1096, is preferably from 0.0005 to 50 mN·cm. The gas permeability of the nonwoven fabric, as measured by Method A (Frazier method) described in JIS L 1096, is preferably from 0.5 to 300 $mL/sec/cm^2$.

In the carbon fiber nonwoven fabric of the invention, the ratio Id/Ig of the peak intensity Id near 1355 $cm^{-1}$ to the peak intensity Ig near 1580 $cm^{-1}$, which indicates the degree of graphitization as measured by Raman spectroscopy, is preferably in a range of from 0.7 to 1.3.

Within this range, the crystalline structure of graphite is disordered and approaches the state of noncrystalline amorphous carbon, meaning that the carbon fiber nonwoven fabric has an even better flexibility.

The fuel cell catalyst supported on the surfaces of the carbon fibers making up the nonwoven fabric may be suitably selected from among catalysts which have hitherto been used as fuel cell catalysts. Exemplary catalysts include metal catalysts (including metal oxides and alloys), carbon alloy catalysts and carbon catalysts. In the present invention, metal catalysts and carbon alloy catalysts are preferred.

Specific examples of metal catalysts include transition metals such as platinum, gold, silver, palladium, iridium, rhodium, ruthenium, iron, cobalt, nickel, chromium, tungsten, manganese and osmium, as well as alloys thereof. Of these, platinum and platinum alloys are preferred. The loading of metal catalyst, although not particularly limited, is typically from about 0.01 to about 10 $mg/cm^2$ (metal basis).

Exemplary carbon alloy catalysts include catalysts which use an element belonging to Period 4, Groups 3 to 12 of the Periodic Table and a carbon source. In the invention, preferred examples include iron-based carbon alloy catalysts, cobalt-based carbon alloy catalysts, iron phthalocyanine-based carbon alloy catalysts, cobalt phthalocyanine-based carbon alloy catalysts, manganese-based carbon alloy catalysts, nickel-based carbon alloy catalysts, copper-based carbon alloy catalysts, titanium-based carbon alloy catalysts, chromium-based carbon alloy catalysts and zinc-based carbon alloy catalysts.

Various techniques known the art may be employed without particular limitation as the method for supporting the above catalysts, although use of the following techniques in the present invention is preferred.

(1) Methods that involve coating a metal precursor onto the fiber surfaces of a conductive CNF nonwoven fabric, then reducing the metal precursor on the surfaces, thereby supporting metal particles on the CNF surfaces (see, for example, Xingwen Yu., Siyu Ye.: "Recent advances in activity and durability enhancement of Pt/C catalytic cathode in PEMFC: Part 1, Physico-chemical and electronic interaction between Pt and carbon support, and activity enhancement of Pt/C catalyst," *Journal of Power Sources*, 172(1), 133-144 (11 Oct., 2007); and Yangchuan Xing: "Polymer-mediated synthesis of highly dispersed Pt nanoparticles of carbon black," *Langmuir*, 21(20), 9334-9338 (2005)).

(2) Methods that involve using an arc plasma deposition system to support catalyst metal particles on the fiber surfaces of a conductive CNF nonwoven fabric (see, for example, JP-A 2007-179963).

(3) The method of supporting a carbon alloy catalyst by coating the fiber surfaces of a conductive CNF nonwoven fabric with a carbon alloy catalyst precursor containing a carbon source such as a resin and a metal precursor, then heat-treating the carbon alloy catalyst precursor (see Patent Document 5 above).

(4) The method of coating a composition of the above-described carbon alloy catalyst precursor, exclusive of the metal ingredient, onto the metal particle-loaded CNF nonwoven fabric obtained by supporting the metal particles required for carbon alloy catalyst formation in method (2) above, then heat-treating the carbon alloy catalyst precursor so as to support the carbon alloy catalyst.

Particularly in cases where a carbon alloy catalyst is to be supported, the carbon alloy catalyst can be highly dispersed on the CNF surface by using above method (4).

The metal precursor is exemplified by the metal complexes, metal salts, metal hydroxides, metal sulfides and metal organic oxides mentioned earlier in the description of the carbon fiber nonwoven fabric.

The conditions employed when using the respective above techniques may be known conditions which are suitable for the metal and other ingredients used.

The membrane electrode assembly of the invention is one which uses the above-described fuel cell electrode, although it is more preferable for the membrane electrode assembly to be composed of an electrolyte layer and, disposed on either side thereof, an anode and a cathode, wherein the above-described fuel cell electrode is used as at least one of the anode and the cathode.

Because the fuel cell electrode of the invention has, as already described, the functions of both a catalyst layer and a gas diffusion layer, when the inventive fuel cell electrode is employed in a membrane electrode assembly, there is no need to use a gas diffusion layer. Therefore, if the fuel cell electrode of the invention is used as either the anode or the cathode, a gas diffusion layer may be omitted on that electrode side.

Hence, the thickness of the membrane electrode assembly can be reduced, enabling the fuel cell stack to be made thinner and smaller, in addition to which, by eliminating one layer, the interfacial resistance can be reduced.

In particular, by employing on the cathode side the inventive electrode which uses flexible carbon nanofibers as the substrate, water produced at the cathode during power generation by the fuel cell can be rapidly discharged from the system, enabling flooding by product water to be effectively prevented.

Moreover, when the fuel cell electrode of the invention is employed in both the anode and the cathode, all of the above-described effects are achieved.

A polymer electrolyte membrane is generally used as the membrane serving as one of the components making up the membrane electrode assembly.

The polymer electrolyte membrane may be suitably selected from among those used in conventional polymer electrolyte fuel cells. Illustrative examples include perfluorosulfonic acid membranes such as Nafion™ (NRE-212CE, from E.I. DuPont de Nemours & Co.) and Flemion™ (from Asahi Glass Co., Ltd.), ethylene-tetrafluoroethylene copolymer resin membranes, fluoropolymer electrolyte membranes such as resin membranes containing trifluorostyrene as the base polymer, and hydrocarbon resin membranes having sulfonic acid groups.

The thickness of the polymer electrolyte membrane, although not particularly limited, is generally from about 5 to about 300 µm.

When the fuel cell electrode of the invention is used as either the anode or the cathode, use may be made of a known gas diffusion layer with catalyst layer thereon as the other electrode.

The catalyst here is exemplified by the same catalysts as were mentioned earlier.

The gas diffusion layer may be, for example, a sheet-like material having electrical conductivity and porosity, such as a carbon particle assembly, a carbon fiber woven fabric, carbon paper, carbon felt or a carbon nonwoven fabric.

Such a gas diffusion layer with catalyst layer thereon can generally be obtained by mixing a commercially available catalyst supported on finely divided carbon particles for a fuel cell catalyst layer with an electrolyte polymer binder such as Nafion™ in a solvent to form a paste, and coating the paste onto the surface of a commercially available water-repellent carbon paper for fuel cells.

Examples of commercially available platinum-loaded carbon particles include UNPC40-II (from Ishifuku Metal Industry Co., Ltd.; 39 wt % Pt/C) and TEC10V40E (from Tanaka Kikinzoku Kogyo K.K.; 40 wt % Pt/C); to some degree, the catalyst loading may also be selected. Use can also be made of a commercial product such as a gas diffusion layer with catalyst layer thereon available from Chemix Co., Ltd. (platinum loading, 0.5 mg/cm$^2$; carbon paper is TGP-H-060 from Toray Industries, Inc.), which is a gas diffusion layer that has been pre-coated with a platinum-loaded carbon paste.

No particular limitation is imposed on the method of manufacturing the above membrane electrode assembly. For example, a method known to the art may be employed, such as that of uniting the electrode with the polymer electrolyte membrane by the application of heat and pressure.

The fuel cell electrode of the invention, as described above, is flexible and can therefore be wound up into a roll.

Accordingly, the membrane electrode assembly can be manufactured by continuously heat and pressure bonding the fuel cell electrode of the invention which has been wound into a roll, together with an electrolyte membrane which has similarly been wound into a roll. At this time, by carrying out heat and pressure bonding while feeding the fuel cell electrode of the invention to both sides of the electrolyte membrane, the membrane electrode assembly can be continuously produced in a single operation, which is extremely efficient.

The fuel cell according to the invention is one which employs the above-described fuel cell electrode, although it is preferable for the fuel cell to be composed of a plurality of unit cells stacked in series, each of which includes a membrane electrode assembly having an electrolyte layer and, disposed on either side thereof, an anode and a cathode; and a pair of separators disposed on either side of the membrane electrode assembly, wherein the fuel cell electrode is used as at least one of the anode and the cathode.

Here, the separators are exemplified by carbon separators and metal separators composed of stainless steel or the like. Channels for the circulation of gases may be formed in the separators.

The electrolyte layer and other components of the fuel cell are the same as described above.

EXAMPLES

Examples of the invention and Comparative Examples are given below by way of illustration, and not by way of limitation. The fiber diameter and thickness of the nonwoven fabric were measured by the following methods. The apparatuses used for transmission electron microscopy and scanning electron microscopy are shown below.

(1) Fiber Diameter

Under examination with an electron microscope (JSM-6701F; JEOL, Ltd.), the sizes of 50 randomly selected fibers were measured and the average fiber diameter was determined.

(2) Thickness of Nonwoven Fabric

Using a digital thickness gauge (SMD-565; Teclock Corporation), the thickness was measured at ten random points, and the average thickness of the fabric was determined.

(3) Transmission Electron Microscope (TEM)

Transmission electron microscopy was carried out using a JEM-2010 from JEOL, Ltd.

(4) Scanning Electron Microscope (SEM)

Scanning electron microscopy was carried out using a JSM-6701F from JEOL, Ltd.

Production Example 1

Production of Conductive Flexible Carbon Nanofiber Nonwoven Fabric (1) Synthesis of Polyacrylonitrile-Polymethacrylic Acid Copolymer A flask was charged with 30.93 g of acrylonitrile (Wako Pure Chemical Industries, Ltd.), 4.07 g of methacrylic acid (Wako Pure Chemical Industries) and 300 mL of pure water, following which deaeration (oxygen removal) was carried out by bubbling through nitrogen gas. Next, the flask contents were heated to 70° C., then a solution of 100 mg of potassium peroxodisulfate (Wako Pure Chemical Industries) dissolved in 50 mL of pure water was poured in under stirring, following which stirring was continued for 4 hours. The cloudy solution was dewatered by concentration with an evaporator, then dried in vacuo, giving about 20 g of a polyacrylonitrile-polymethacrylic acid copolymer.

(2) Preparation of Electrospinning Dope

An electrospinning dope was prepared by mixing together and dissolving 3.5 wt % of the polyacrylonitrile-polymethacrylic acid copolymer, 3.0 wt % of phenolic resin (PSK-2320, from Gunei Chemical Industry Co., Ltd.), 3.5 wt % of titanium(IV) butoxide (Aldrich Co.) in 90.0 wt % of dimethylformamide (Wako Pure Chemical Industries; guaranteed reagent).

(3) Electrospinning

The electrospinning dope obtained as described above was set in an electrospinning system (ESP-2300, from Fuence Co., Ltd.) and electrospun at a needle outlet diameter of 0.5 mm, an applied voltage of 17 kV, an extrusion pressure of 7 kPa and a relative humidity of 50% (25° C.), thereby forming a nanofiber nonwoven fabric built up to a thickness of 30 μm with filaments having a diameter of about 600 nm.

(4) Curing (Stabilization) Treatment

Curing treatment was carried out by placing the nanofiber nonwoven fabric in an oven, heating the oven from room temperature to 250° C. over a period of 1.5 hours in an air environment, then additionally holding the oven at 250° C. for 1 hour.

(5) Heat-Treating (Carbonizing Treatment)

After curing treatment, the nanofiber nonwoven fabric was subjected to carbonizing treatment under the following conditions, giving a conductive carbon nanofiber nonwoven fabric.

Heating rate: 10° C./min
Holding temperature: 1,500° C.
Holding time: 60 min
Nitrogen flow rate: 5 L/min The resulting conductive carbon nanofiber nonwoven fabric was examined under an electron microscope, based on which it was confirmed that the fibers had not fused together and united. The fiber diameter was about 500 nm. The nonwoven fabric had a thickness of 20 μm.

This nonwoven fabric (sample size: 10 cm×10 cm) did not break even when folded in two, placed between two stainless steel plates and subjected to 98 kPa (1 kgf/cm$^2$) of loading, and was thus confirmed to be flexible.

Example 1

(1) Production of Reduced Platinum-Loaded Flexible Carbon Nanofiber Nonwoven Fabric A solution was prepared by weight out 133 mg of hexachloroplatinic(IV) acid hexahydrate (Aldrich Co.), 2 mg of polyacrylic acid (Aldrich Co.) and 865 mg of water into a test tube, then stirring at room temperature for about 1 hour until dissolution occurred. To this solution was added 1,000 mg of ethanol (Wako Pure Chemical Industries, Ltd.), followed by stirring to uniform mixture (platinum equivalent, 25 mg/mL).

In a separation operation, a 25 cm$^2$ (5-cm square) piece of the conductive flexible carbon nanofiber nonwoven fabric obtained in Production Example 1 was placed on a heat-resistant polytetrafluoroethylene (PTFE) sheet, and 500 mg of the solution prepared above was dripped onto the fabric with a pipette and uniformly impregnated therein.

The solution-impregnated nonwoven fabric, while still on the PTFE sheet, was placed in an oven and heat-treated in an air atmosphere at a heating rate of about 3° C./min up to 550° C., thereby supporting platinum particles on the conductive flexible carbon nanofiber surfaces. The weight gain by the fabric following support was 12.5 mg, from which it was apparent that the platinum loading was 0.5 mg/cm$^2$.

Figure 1:
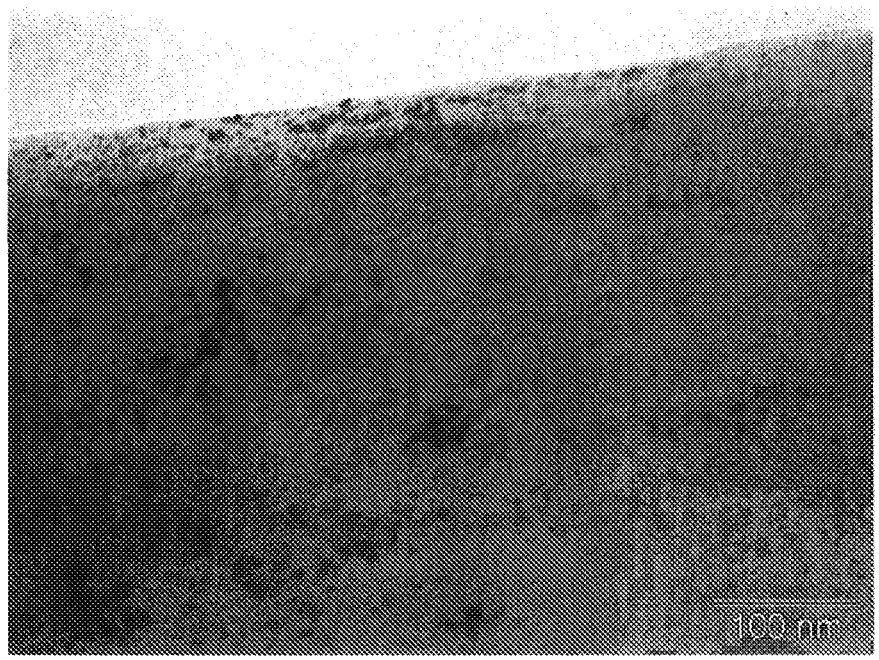
FIG. 1 is a transmission electron micrograph of the platinum-loaded flexible carbon nanofiber nonwoven fabric obtained in Example 1.

The structure of the resulting platinum-loaded carbon nanofiber nonwoven fabric was examined with a transmission electron microscope. The results are shown in FIG. 1. As shown in FIG. 1, platinum particles with particle sizes of from 2 to 10 nm were supported on the surfaces of the carbon nanofibers.

(2) Production of Membrane Electrode Assembly (MEA)

An amount of 500 µL of a solution prepared by diluting a 10% Nafion™ solution (Aldrich Co.) to 5% with ethanol was evenly added dropwise onto the platinum-loaded nanofiber nonwoven fabric (25 cm$^2$; thickness, 20 µm) obtained in (1) above and absorbed therein, following which the fabric was air-dried. Two square pieces, each measuring 2.5 cm on a side, were cut out of this nonwoven fabric and placed at the center on either side of a 5-cm square Nafion™ membrane (NRE-212CE, from DuPont) as the electrolyte membrane. The assembled layers, while being protected with PTFE sheets, were then pressed at 200 kPa and 160° C., producing a MEA having the following 3-layer construction: platinum-loaded flexible carbon nanofiber nonwoven fabric (anode)/electrolyte membrane/platinum-loaded flexible carbon nanofiber nonwoven fabric (cathode).

Example 2

(1) Arc Plasma (AP)-Deposited Platinum-Loaded Flexible Carbon Nanofiber Nonwoven Fabric A 25 cm$^2$ (5-cm square) piece of the conductive flexible carbon nanofiber nonwoven fabric obtained in Production Example 1 was set in an arc plasma deposition system (APD-P, from Ulvac, Inc.) and, using platinum as the vapor deposition source, a platinum-loaded flexible carbon nanofiber nonwoven fabric was obtained at a discharge voltage of 400 V, a capacitance of 50 µF, discharge frequency of 1 Hz, and with 500 shots. The weight gain was 12.5 mg, from which it was apparent that the platinum loading was 0.5 mg/cm$^2$.

Figure 2:
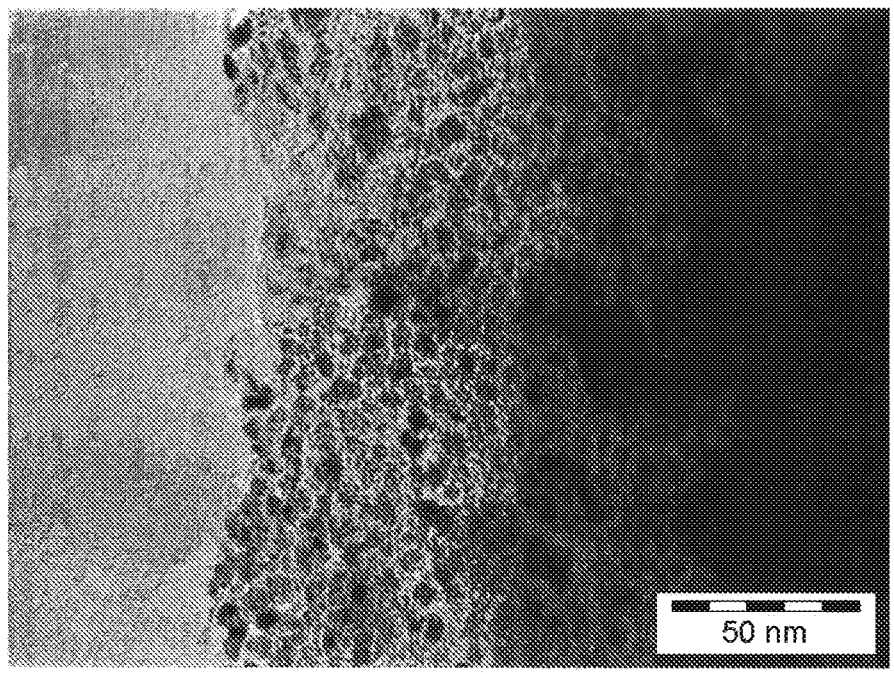
FIG. 2 is a transmission electron micrograph of the platinum-loaded flexible carbon nanofiber nonwoven fabric obtained in Example 2.

A transmission electron micrograph of the structure of the resulting platinum-loaded flexible carbon nanofiber nonwoven fabric is shown in FIG. 2. It is apparent from FIG. 2 that platinum particles having particle sizes of from 2 to 10 nm are supported over the entire surfaces of the carbon nanofibers.

(2) Production of Membrane Electrode Assembly (MEA)

Aside from using the platinum-loaded flexible carbon nanofiber nonwoven fabric produced by arc plasma deposition as both the anode and the cathode, an MEA having a three-layer construction was produced in the same way as in Example 1.

Example 3

Carbon Alloy Catalyst-Loaded Flexible Carbon Nanofiber Nonwoven Fabrics

Example 3-1

(1) Fe-Based Carbon Alloy Catalyst-Loaded Flexible Carbon Nanofiber Nonwoven Fabric A coating solution was prepared by mixing together 1.5 g of the polyacrylonitrile-polymethacrylic acid copolymer obtained by the method described in Production Example 1(1), 1.5 g of iron chloride hexahydrate (Wako Pure Chemical Industries, Ltd.), 1.5 g of 2-methylimidazole (Wako Pure Chemical Industries, Ltd.) and 20.5 g of dimethylformamide (Wako Pure Chemical Industries, Ltd.), then stirring the mixture for 2 hours.

Next, the conductive carbon nanofiber nonwoven fabric obtained in Production Example 1 was cut into a 10 cm diameter circle and set on a glass filter of the same diameter. The coating solution prepared above was poured through this and suction filtered, thereby uniformly coating the Fe-based carbon alloy catalyst precursor coating solution onto the conductive nanofiber surfaces. The coated nonwoven fabric was transferred to a vacuum desiccator and vacuum dried at 60° C.

The coated nonwoven fabric was then placed in an oven and the applied coat was subjected to stabilization treatment by raising the temperature from room temperature to 250° C. over a period of 1.5 hours in an air atmosphere, followed by 1 hour of standing at 250° C. The nonwoven fabric on which the applied coat had been stabilized was then pre-heat-treated in a nitrogen atmosphere under the following conditions: heating rate, 10° C./min; holding temperature, 600° C.; holding time, 60 min; nitrogen flow rate, 5 L/min. The pre-heat-treated nonwoven fabric was soaked in concentrated hydrochloric acid to remove the iron. Next, the nonwoven fabric was neutralized, rinsed with water and dried, then heat-treated in a nitrogen atmosphere at a heating rate of 10° C./min, a holding temperature of 900° C., a holding time of 60 min and a nitrogen flow rate of 5 L/min, thereby giving an Fe-based carbon alloy catalyst-loaded flexible carbon nanofiber nonwoven fabric.

The structure of the resulting Fe-based carbon alloy catalyst-loaded flexible carbon nanofiber nonwoven fabric was examined with a scanning electron microscope and a transmission electron microscope. The resulting images are shown respectively in FIGS. 3 and 4.

Figure 3:
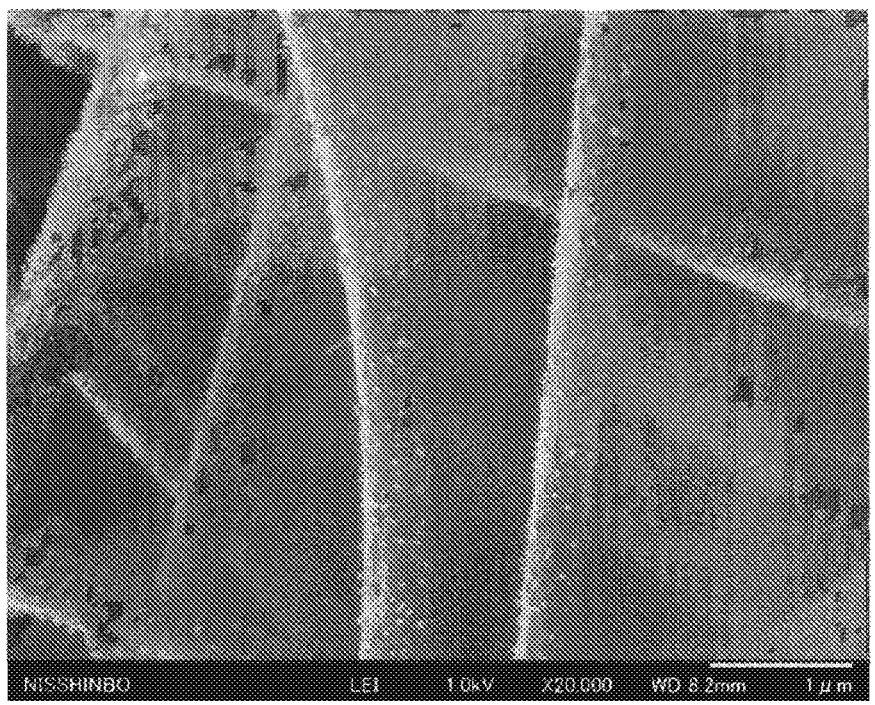
FIG. 3 is a scanning electron micrograph of the iron-based carbon alloy catalyst-loaded carbon nanofiber nonwoven fabric obtained in Example 3-1.
Figure 4:
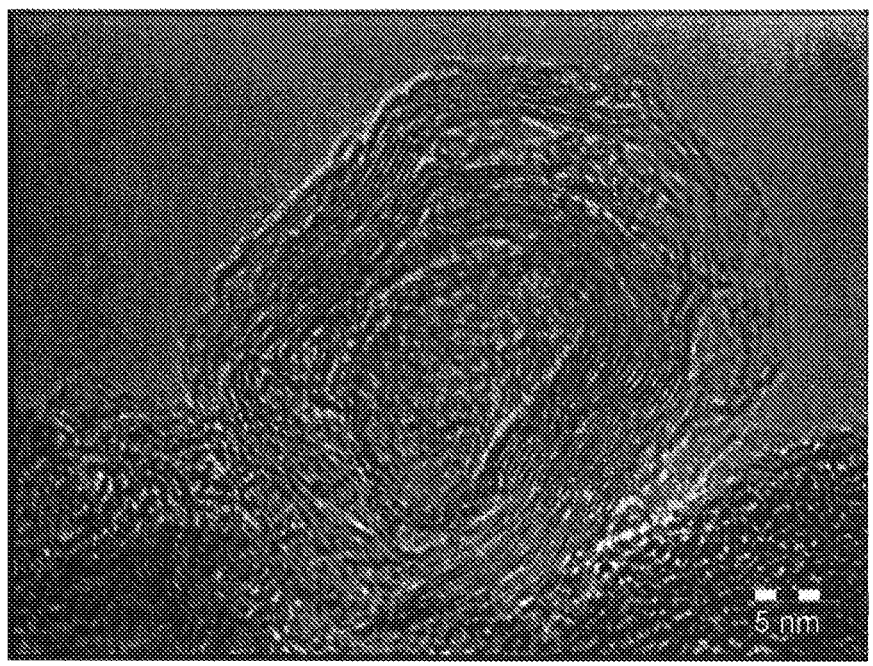
FIG. 4 is a transmission electron micrograph of the iron-based carbon alloy catalyst-loaded carbon nanofiber nonwoven fabric obtained in Example 3-1.

As shown in FIG. 3, catalyst particles were found to be supported on the fiber surfaces. Moreover, as shown in FIG. 4, a nanoshell structure (the active structure of a carbon alloy-based catalyst) was observed at the fiber surfaces.

(2) Production of Membrane Electrode Assembly (MEA)

An amount of 500 µL of a solution prepared by diluting a 10% Nafion™ solution (Aldrich Co.) to 5% with ethanol was evenly added dropwise onto the Fe-based carbon alloy catalyst-loaded nanofiber nonwoven fabric and absorbed therein, following which the fabric was air-dried. One square piece measuring 2.5 cm on a side was cut out of the fabric and placed at the center on one side of a 5-cm square Nafion™ membrane (NRE-212CE, from DuPont), thereby forming a cathode side.

Using the 0.5 mg/cm$^2$ platinum catalyst-loaded flexible carbon nanofiber nonwoven fabric produced in Example 1 as the anode side, the assembled layers were pressed at 200 kPa and 160° C. while being protected on both sides with PTFE sheets, thereby producing a MEA having the following 3-layer construction: platinum-loaded flexible carbon nanofiber nonwoven fabric (anode)/electrolyte membrane/Fe-based carbon alloy catalyst-loaded flexible carbon nanofiber nonwoven fabric (cathode).

Example 3-2

(1) Co-Based Carbon Alloy Catalyst-Loaded Flexible Carbon Nanofiber Nonwoven Fabric A coating solution was prepared by mixing together 1.5 g of the polyacrylonitrile-polymethacrylic acid copolymer obtained by the method described in Production Example 1(1), 1.5 g of cobalt chloride hexahydrate (Wako Pure Chemical Industries, Ltd.), 1.5 g of 2-methylimidazole (Wako Pure Chemical Industries, Ltd.) and 20.5 g of dimethylformamide (Wako Pure Chemical Industries, Ltd.), then stirring the mixture for 2 hours.

Next, the conductive carbon nanofiber nonwoven fabric obtained in Production Example 1 was cut into a 10 cm diameter circle and set on a glass filter of the same diameter. The coating solution was poured through this and suction filtered, thereby uniformly coating the Co-based carbon alloy catalyst precursor coating solution onto the conductive nanofiber surfaces. The coated nonwoven fabric was transferred to a vacuum desiccator and vacuum dried at 60° C. The coated nonwoven fabric was then placed in an oven and the applied coat was subjected to stabilization treatment by, in an air atmosphere, raising the temperature from room temperature to 250° C. over a period of 1.5 hours, followed by 1 hour of standing at 250° C. Next, the nonwoven fabric was heat-treated under the following conditions: heating rate, 10° C./min; holding temperature, 900° C.; holding time, 60 min; nitrogen flow rate, 5 L/min. The heat-treated nonwoven fabric was soaked in concentrated hydrochloric acid to remove the cobalt, then neutralized, rinsed with water and dried, thereby giving a Co-based carbon alloy catalyst-loaded flexible carbon nanofiber nonwoven fabric.

(2) Production of Membrane Electrode Assembly (MEA)

Aside from using a Co-based carbon alloy catalyst-loaded flexible carbon nanofiber nonwoven fabric instead of an Fe-based carbon alloy catalyst-loaded flexible carbon nanofiber nonwoven fabric, a MEA having a three-layer construction was produced in the same way as in Example 3-1(2). A scanning electron micrograph of the cathode side of the resulting MEA is shown in FIG. 8.

Example 3-3

(1) PcFe-Based Carbon Alloy Catalyst-Loaded Flexible Carbon Nanofiber Nonwoven Fabric A coating solution was prepared by mixing together 1.5 g of the polyacrylonitrile-polymethacrylic acid copolymer obtained by the method described in Production Example 1(1), 1.5 g of iron phthalocyanine (Wako Pure Chemical Industries, Ltd.), 1.5 g of methylimidazole (Wako Pure Chemical Industries, Ltd.) and 20.5 g of dimethylformamide (Wako Pure Chemical Industries, Ltd.), then stirring the mixture for 2 hours.

Subsequent treatment was carried out in the same way as in Example 3-1(1), giving a PcFe-based carbon alloy catalyst-loaded flexible carbon nanofiber nonwoven fabric.

(2) Production of Membrane Electrode Assembly (MEA)

Aside from using a PcFe-based carbon alloy catalyst-loaded flexible carbon nanofiber nonwoven fabric instead of an Fe-based carbon alloy catalyst-loaded flexible carbon nanofiber nonwoven fabric, a MEA having a three-layer construction was produced in the same way as in Example 3-1(2).

Example 3-4

(1) PcCo-Based Carbon Alloy Catalyst-Loaded Flexible Carbon Nanofiber Nonwoven Fabric A coating solution was prepared by mixing together 1.5 g of the polyacrylonitrile-polymethacrylic acid copolymer obtained by the method described in Production Example 1(1), 1.5 g of cobalt phthalocyanine (Wako Pure Chemical Industries, Ltd.), 1.5 g of 2-methylimidazole (Wako Pure Chemical Industries, Ltd.) and 20.5 g of dimethylformamide (Wako Pure Chemical Industries, Ltd.), then stirring the mixture for 2 hours.

Subsequent treatment was carried out in the same way as in Example 3-2(1), giving a PcCo-based carbon alloy catalyst-loaded flexible carbon nanofiber nonwoven fabric.

(2) Production of Membrane Electrode Assembly (MEA)

Aside from using a PcCo-based carbon alloy catalyst-loaded flexible carbon nanofiber nonwoven fabric instead of an Fe-based carbon alloy catalyst-loaded flexible carbon nanofiber nonwoven fabric, a MEA having a three-layer construction was produced in the same way as in Example 3-1(2).

Example 4

AP-Deposited Carbon Alloy Catalyst-Loaded Flexible Carbon Nanofiber Nonwoven Fabric Example 4-1

AP-Deposited Fe-Based System (1) Fe-Based Catalyst-Loaded Flexible Carbon Nanofiber Nonwoven Fabric A coating solution was prepared by mixing together 1.5 g of the polyacrylonitrile-polymethacrylic acid copolymer obtained by the method described in Production Example 1(1), 1.5 g of 2-methylimidazole (Wako Pure Chemical Industries, Ltd.) and 22 g of dimethylformamide (Wako Pure Chemical Industries, Ltd.), then stirring the mixture for 2 hours.

The conductive carbon nanofiber nonwoven fabric obtained in Production Example 1 was cut into a 10 cm diameter circle and set on a glass filter of the same diameter. The coating solution was poured through this and suction filtered, thereby uniformly coating the carbon-based catalyst precursor coating solution onto the conductive nanofiber surfaces. The coated nonwoven fabric was transferred to a vacuum desiccator and vacuum dried at 60° C.

Next, aside from using iron as the vapor deposition source, iron was vapor deposited onto the vacuum-dried nonwoven fabric in the same way as in Example 2, thereby giving a carbon nanofiber nonwoven fabric on which finely divided particles of iron are highly dispersed.

This nonwoven fabric was subjected to the coat stabilization and subsequent treatment steps described in Example 3-1(1), thereby giving an AP-deposited Fe-based catalyst-loaded flexible carbon nanofiber nonwoven fabric.

(2) Production of Membrane Electrode Assembly (MEA)

Aside from using an AP-deposited Fe-based catalyst-loaded flexible carbon nanofiber nonwoven fabric instead of an Fe-based carbon alloy catalyst-loaded flexible carbon nanofiber nonwoven fabric, a MEA having a three-layer construction was produced in the same way as in Example 3-1(2).

Example 4-2

AP-Deposited Co-Based System (1) Co-Based Catalyst-Loaded Flexible Carbon Nanofiber Nonwoven Fabric Aside from using cobalt as the vapor deposition source, the same treatment as in Example 4-1(1) was carried out prior to coat stabilization treatment, thereby giving a carbon nanofiber nonwoven fabric on which cobalt particles are highly dispersed and which has been coated with a carbon-based catalyst precursor.

This nonwoven fabric was subjected to the coat stabilization and subsequent treatment steps described in Example 3-2(1), thereby giving an AP-deposited Co-based catalyst-loaded flexible carbon nanofiber nonwoven fabric.

(2) Production of Membrane Electrode Assembly (MEA)

Aside from using an AP-deposited Co-based catalyst-loaded flexible carbon nanofiber nonwoven fabric instead of an Fe-based carbon alloy catalyst-loaded flexible carbon nanofiber nonwoven fabric, a MEA having a three-layer construction was produced in the same way as in Example 3-1(2).

Comparative Example 1

MEA with 5-Layer Construction

Two 2.5-cm square pieces were cut out of a commercial gas diffusion layer with catalyst layer thereon (platinum loading, 0.5 mg/cm$^2$; available from Chemix Co., Ltd.; carbon paper is TGP-H-060, from Toray Industries, Inc.), and the two pieces were placed at the center on either side of a 3-cm square Nafion™ membrane such that the catalyst layer on each side was in contact with the Nafion™ membrane. The assembled layers were pressed at 200 kPa and 160° C., thereby producing an MEA having the following five-layer construction: gas diffusion layer/catalyst layer/electrolyte membrane/catalyst layer/gas diffusion layer.

Fuel cell power generation tests were carried out by the methods described below on the MEAs obtained in the above examples of the invention and in Comparative Example 1.

Fuel Cell Power Generation Test

Testing was carried out with a fuel cell test system (AutoPEMNSB-01, from Toyo Corporation) at a cell temperature of 80° C., 100% relative humidity, at hydrogen and oxygen flow rates of 1 mL/min each, and an exhaust gas pressure of 50 kPa. The current density versus voltage is shown in FIG. 5, and the current density versus resistance is shown in FIG. 6.

As shown in FIG. 5, it was apparent that, compared with the MEA having a 5-layer construction of Comparative Example 1 in which a conventional catalyst layer composed of platinum on carbon is used in combination with a gas diffusion layer, the MEAs according to the present invention produce a voltage even at high current densities. This indicates that the product water was rapidly discharged outside of the system, thereby preventing the catalyst from being covered by water (flooding), which would keep fuel gas from reaching all areas of the catalyst).

Moreover, when the same platinum catalyst was supported on conductive flexible carbon nanofibers, even at a high open-circuit voltage (OCV) and the same current density, a high voltage was always exhibited, suggesting that the MEAs of the invention also had a better catalyst utilization, gas utilization and transmission of electricity.

In addition, as shown in FIG. 6, compared with the MEA having a 5-layer construction of Comparative Example 1 in which a conventional catalyst layer composed of platinum on carbon was used in combination with a gas diffusion layer, the MEAs of the invention were found to have very low fuel cell resistances.

Major factors underlying the lower resistance than in a conventional MEA (Comparative Example 1) are thought to include the following: (1) a decrease in interfacial resistance due to two fewer interfaces (between the catalyst layers and the gas diffusion layers) owing to the reduction in the number of layers from 5 to 3, (2) electricity generated from the catalyst was transmitted without loss to the conductive flexible carbon nanofibers, and (3) electricity was efficiently transmitted along the nanofibers and led out of the system.

In addition, these results also suggest that electricity is efficiently extracted from carbon alloy catalysts, which have a poor conductivity.

From the results in FIGS. 5 and 6 above, it was found to be possible to reduce the amount of platinum catalyst used. Accordingly, the following comparative experiments were carried out.

Comparative Experiments on Catalyst Loading

The catalyst utilizations in platinum-loaded electrode pastes based on commonly used particulate carbon materials and in the catalyst-loaded flexible nanofiber nonwoven fabrics of the invention were compared.

For the sake of impartial comparison, gas diffusion layers were used even in the catalyst-loaded flexible nanofiber nonwoven fabrics of the invention.

Example 5

(1) Platinum Catalyst-Loaded Flexible Carbon Nanofiber Nonwoven Fabric

When producing a platinum catalyst-loaded flexible carbon nanofiber nonwoven fabric by the same method as in Example 1, the platinum loading was set by adjusting the amount of hexachloroplatinic(IV) acid hexahydrate, thereby giving three types of platinum catalyst-loaded flexible carbon nanofiber nonwoven fabrics on which platinum was supported in respective amounts of 0.05 mg/cm$^2$, 0.1 mg/cm$^2$ and 0.5 mg/cm$^2$. The loadings were confirmed from weight changes in the nonwoven fabric.

(2) Production of Membrane Electrode Assembly (MEA)

An amount of 500 μL of a solution prepared by diluting a 10% Nafion™ solution (Aldrich Co.) to 5% with ethanol was evenly added dropwise onto the platinum-loaded nanofiber nonwoven fabrics (25 cm$^2$; thickness, 20 μm) of different platinum loadings obtained in (1) above and absorbed therein, following which the fabrics were air-dried. In each case, two square pieces, each measuring 2.5 cm on a side, were cut from these nonwoven fabrics and placed at the center on one side of a 5-cm square Nafion™ membrane (NRE-212CE, from DuPont), in addition to which carbon paper (TGP-H-060 from Toray Industries, Inc.) was placed on the outside thereof. A platinum catalyst on gas diffusion layer (from Chemix Co., Ltd.; the carbon paper was TGP-H-060 from Toray Industries, Inc.) was placed on the other side of the Nafion™ membrane. The assembled layers were then pressed at 200 kPa and 160° C. while being protected with PTFE sheets, producing MEAs having the following 5-layer construction: gas diffusion layer/-catalyst layer (anode)/electrolyte membrane/platinum-loaded flexible carbon nanofiber nonwoven fabric/gas diffusion layer (cathode).

Comparative Example 2

(1) Preparation of Catalyst Paste

UNPC40-II (from Ishifuku Metal Industry Co., Ltd.; 39 wt % Pt/C) was weighed out, then an amount of water equivalent to twice the weight of this platinum on carbon was added thereto and the ingredients were thoroughly dispersed in an ultrasonic mixer.

Next, a 5 wt % Nafion™ solution (DuPont) in an amount equivalent to ten times the weight of the platinum on carbon was added and the ingredients were again thoroughly dispersed in an ultrasonic mixer. Then, isopropyl alcohol (Wako Pure Chemical Industries, Ltd.) was added in the same amount as the water and the ingredients were once again thoroughly agitated in an ultrasonic mixer, thereby giving a platinum-loaded carbon paste.

(2) Production of Catalyst Layer

The above platinum-loaded carbon paste was coated onto a PTFE sheet by the doctor blade method. The coating thickness at this time was adjusted so as to set the amount of platinum per unit surface area to either 0.1 mg/cm$^2$ or 0.5 mg/cm$^2$. The applied paste was then dried, giving a catalyst layer.

When a catalyst layer having a platinum loading of 0.05 mg/cm$^2$ was formed on a PTFE sheet, the catalyst layer was too thin and cracking arose during drying. Hence, in this case, the paste was directly coated by the doctor blade method onto the carbon paper (TGP-H-060 from Toray Industries, Inc.) serving as the gas diffusion layer and dried.

(3) Production of MEA

The catalyst layers having a platinum loading of 0.1 mg/cm$^2$ or 0.5 mg/cm$^2$ obtained as described above were each cut, together with the PTFE sheet, into 2.5-cm square pieces and transferred to the center on one side of a 5-cm square Nafion™ membrane (NRE-212CE, from DuPont), in addition to which carbon paper (TGP-H-060 from Toray Industries, Inc.) was placed on the outside thereof. In the case of the catalyst layer having a platinum loading of 0.05 mg/cm$^2$, this was cut, together with the carbon paper, into a 2.5-cm square piece and placed at the center of a Nafion™ membrane.

A platinum catalyst on gas diffusion layer (from Chemix Co., Ltd.; the carbon paper was TGP-H-060 from Toray Industries, Inc.) was disposed on the other side of the Nafion™ membrane. While protecting the outside of the carbon paper with a PTFE sheet, the assembled layers were pressed at 200 kPa and 160° C., thereby giving a MEA having the following 5-layer construction: gas diffusion layer/catalyst layer (anode)/electrolyte membrane/platinum-loaded carbon paste layer/gas diffusion layer (cathode).

Comparative Example 3

Aside from changing the platinum on carbon used to TEC10V40E (from Tanaka Kikinzoku Kogyo K.K.; 40 wt % Pt/C), a MEA having the following 5-layer construction was produced: gas diffusion layer/catalyst layer (anode)/electrolyte membrane/platinum-loaded carbon paste layer/gas diffusion layer (cathode).

The same fuel cell power generation test as in Example 1 was carried out on the MEAs obtained in Example 5 and Comparative Examples 2 and 3 above. The relationship of platinum loading versus voltage is shown in FIG. 7.

The results shown in FIG. 7 suggest that, at each loading, the catalyst is more efficiently used when supported on conductive flexible carbon nanofiber surfaces.

Comparative Example 4

Example 5 in Patent Document 5 is an example in which a carbon nanofiber precursor was electrospun into nanofibers, which were then heat-treated at 2,950° C., forming a conductive carbon nanofiber nonwoven fabric. Next, a carbon alloy catalyst precursor solution was sprayed onto one side of the fabric, and heat-treating was carried out at 900° C., thereby supporting a carbon alloy catalyst on the surface fibers on one side of the nonwoven fabric.

For the sake of comparison with the fuel cell electrode and MEA of the present invention, a carbon alloy catalyst carbon nanofiber and MEA were produced by the same methods as in Example 5 of Patent Document 5, and the cathode side (carbon alloy catalyst carbon nanofiber electrode) of the resulting MEA was examined with a scanning electron microscope. The results are shown in FIG. 9.

As shown in FIG. 9, in the MEA obtained in Example 5 of Patent Document 5, it is apparent that the fibers of the carbon nanofiber nonwoven fabric broke during pressing and are no longer in the form of a nonwoven fabric body, and moreover that the fibers have disintegrated into very short fibers, arriving at the same structure as the catalyst layers built up of carbon particles that are typically used.

In this state, the short fibers separate away from the catalyst layer, spilling out of the MEA, i.e., into the separator serving as the fuel gas supply and exhaust system, and into flow channels on the separator, which invites degradation of the catalyst layer and may also lead to obstruction of the fuel gas supply channels.

On the other hand, as shown in the scanning electron micrograph of the MEA produced in Example 3-2 (FIG. 8), when flexible carbon nanofibers are used in the MEA, the structure of the nonwoven fabric structure is preserved even after pressing. This suggests that, in the cathode, gas diffusion, water vapor diffusion and water discharge which utilize gaps between the fibers are made more efficient.

Example 6

Use Only in Cathode or Anode

An evaluation was carried out of the cell performance when the platinum catalyst-loaded flexible nanofiber nonwoven fabric obtained in Example 1 is used only in the cathode or only in the anode.

Example 6-1

Use Only in Cathode

Aside from using as the anode a commercial gas diffusion layer with catalyst layer thereon with a platinum loading of 0.5 mg/cm$^2$ (available from Chemix Co., Ltd.; carbon paper is TGP-H-060 from Toray Industries, Inc.) having a size of 2.5 cm square, an MEA with the following four-layer construction was produced in the same way as in Example 1: gas diffusion layer/catalyst layer (anode)/electrolyte membrane/platinum-loaded flexible carbon nanofiber nonwoven fabric (cathode).

Example 6-2

Use Only in Anode

Aside from using as the cathode a commercial gas diffusion layer with catalyst layer thereon with a platinum loading of 0.5 mg/cm$^2$ (available from Chemix Co., Ltd.; carbon paper is TGP-H-060 from Toray Industries, Inc.) having a size of 2.5 cm square, an MEA with the following four-layer construction was produced in the same way as in Example 1: platinum-loaded flexible carbon nanofiber nonwoven fabric (anode)/electrolyte membrane/catalyst layer/gas diffusion layer (cathode).

The fuel cell performances were evaluated by the same method as in Example 1 for the MEAs produced in Examples 6-1 and 6-2 above. The results are shown in FIGS. 10 and 11. For the sake of comparison, the results from Comparative Example 1 are also shown in FIGS. 10 and 11.

As shown in FIG. 10, compared with a conventional MEA having a 5-layer construction (Comparative Example 1), the power generating performance by the fuel cell was found to improve both in cases where the platinum catalyst-loaded flexible nanofiber nonwoven fabric of the invention was used only on the cathode side, and in cases where the same was used only on the anode side. The reason why the power generation performance increased more when the above fabric was used only on the cathode side than when it was used only on the anode side is presumably due to the effective suppression of flooding, which is a phenomenon specific to the cathode side.

Moreover, as shown in FIG. 11, at current densities lower than 1,500 mA/cm$^2$, an MEA in which the platinum catalyst-loaded flexible nanofiber nonwoven fabric of the invention is used only on the cathode side or only on the anode side can be seen to have a lower resistance than a conventional MEA having a five-layer construction (Comparative Example 1). Because water is not produced on the anode side, in cases where the platinum catalyst-loaded flexible nanofiber nonwoven fabric of the invention is used only on the anode side, there is no flooding suppressing effect. Yet, even in such cases, the resistance value is clearly lower than for a conventional MEA having a 5-layer construction.

It will be evident from the foregoing that the performance of a fuel cell improves when the platinum catalyst-loaded flexible nanofiber nonwoven fabric of the invention is used in the membrane electrode assembly.

The invention claimed is:

1. A fuel cell electrode having both a gas diffusion function and an electrocatalyst function, consisting of:
    a flexible carbon fiber nonwoven fabric from a nonwoven fabric electrospun, the nonwoven fabric electrospun comprising a composition containing an electrospinnable polymeric substance, an organic compound as a carbon precursor different from the electrospinnable polymeric substance, and a transition metal; and
    a fuel cell catalyst supported on surfaces of the carbon fibers making up the carbon fiber nonwoven fabric, wherein
    the nonwoven fabric electrospun is carbonized to form the flexible carbon fiber nonwoven fabric.

2. The fuel cell electrode of claim 1, wherein the fuel cell catalyst is a metal catalyst or a carbon alloy catalyst.

3. A membrane electrode assembly comprising an electrolyte layer and, disposed on either side thereof, an anode and a cathode,
    wherein at least one of the anode and the cathode is comprised of the fuel cell electrode of claim 1.

4. The membrane electrode assembly of claim 3, wherein the cathode is comprised of the fuel cell electrode.

5. The membrane electrode assembly of claim 3, wherein the anode and the cathode are each comprised of the fuel cell electrode.

6. A fuel cell comprising a plurality of unit cells stacked in series, each of which includes: a membrane electrode assembly having an electrolyte layer and, disposed on either side thereof, an anode and a cathode; and a pair of separators disposed on either side of the membrane electrode assembly,
    wherein at least one of the anode and the cathode is comprised of the fuel cell electrode of claim 1.

7. The fuel cell of claim 6, wherein the cathode is comprised of the fuel cell electrode.

8. The fuel cell of claim 6, wherein the anode and the cathode are each comprised of the fuel cell electrode.

9. A membrane electrode assembly comprising the fuel cell electrode of claim 1.

10. A fuel cell comprising the fuel cell electrode of claim 1.

* * * * *